Oct. 8, 1929.  R. H. PROSSER  1,731,059
RESILIENT WHEEL
Filed Nov. 29, 1927  2 Sheets-Sheet 2
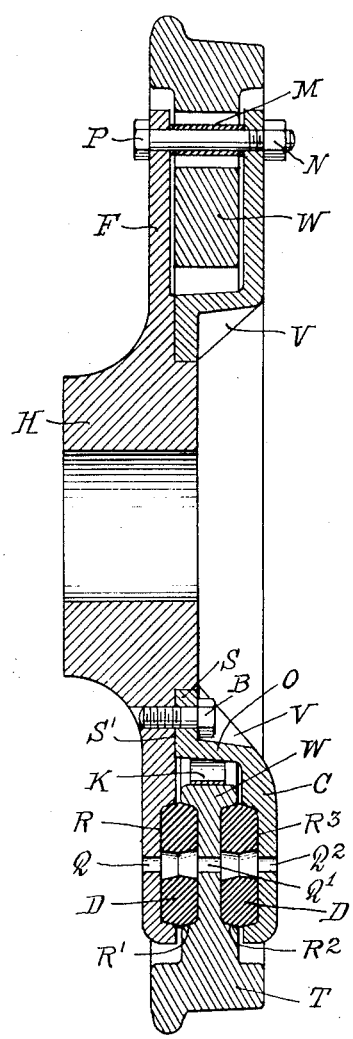
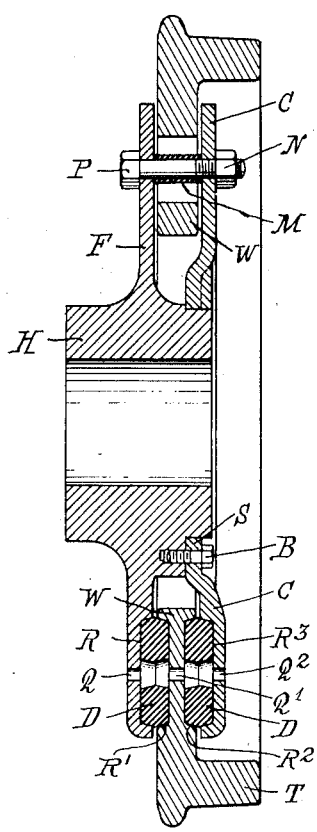
WITNESS
G. V. Rasmussen
INVENTOR
ROBERT H. PROSSER
BY
Biesen & Schrenk
ATTORNEYS Patented Oct. 8, 1929

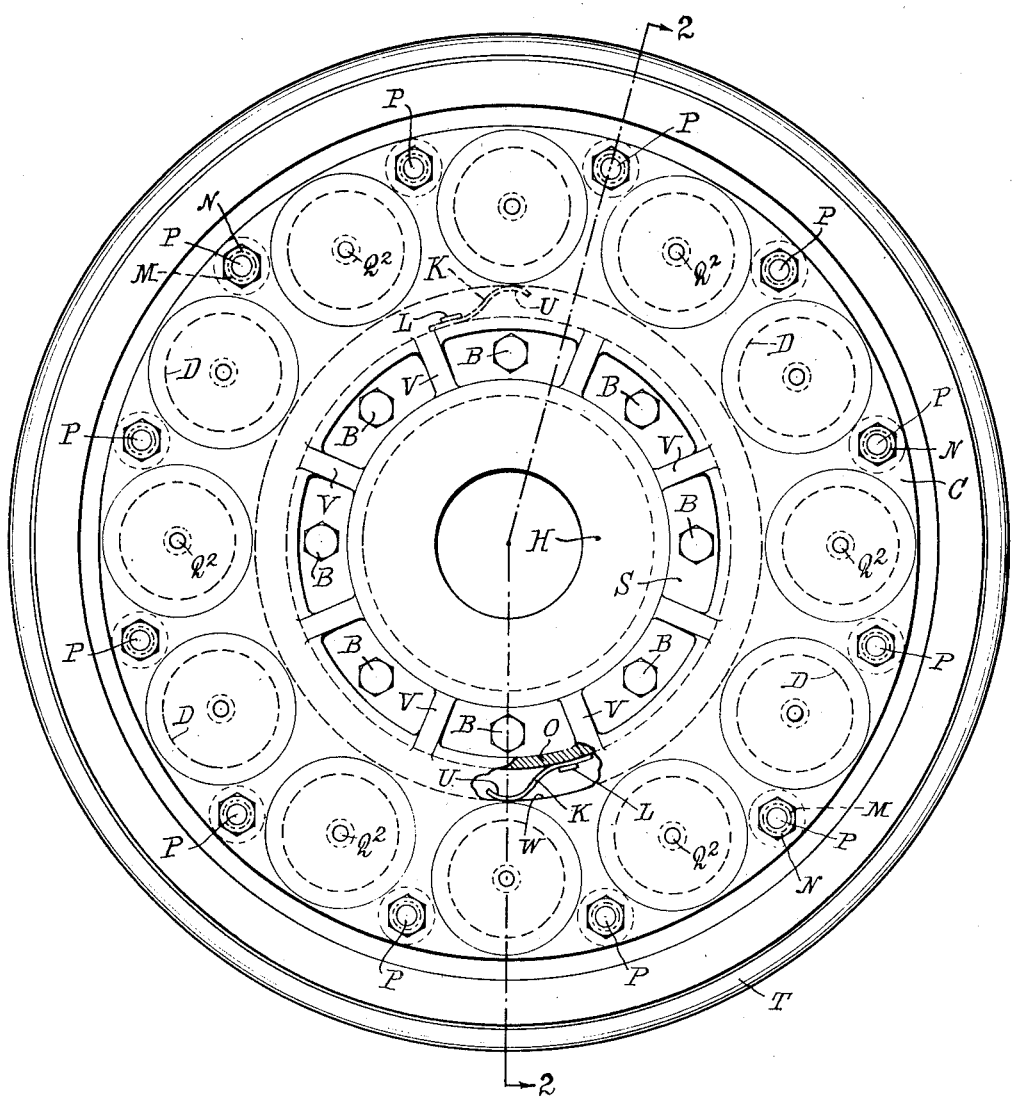

1,731,059

UNITED STATES PATENT OFFICE

ROBERT H. PROSSER, OF OAKLAND, CALIFORNIA

RESILIENT WHEEL

Application filed November 29, 1927. Serial No. 236,420.

This invention relates to resilient wheels and more particularly to a construction peculiarly appropriate in the case of street car wheels or wheels adapted to ride on rails.

The construction of wheels for railway uses involves many special problems which have thus far militated against the practical adoption of any resilient element in connection with any such wheels. It is the object of this invention to supply a construction which is practical, commercial, economical, and which fulfills the requirements with respect to such wheels. The invention is illustrated in the accompanying drawings in which Fig. 1 is a side elevation, partly broken away, of a wheel embodying my invention, and Fig. 2 is a sectional view on line 2—2 of Fig. 1 and Fig. 3 is a sectional view of a similar wheel, but of somewhat lighter construction, appropriate for wheels of smaller diameter than those shown in Fig. 2. In the drawings H indicates a hub which, in car wheel construction, is made of metal and preferably of a tough elastic metal of any well known composition which is adapted to resist the strains and stresses of operation. Integral with the hub H is a radially extending flange F which is provided with a plurality of recesses R disposed at spaced intervals adjacent to the periphery of the flange F. In the illustrated construction each of the recesses R is of circular shape and is provided with a central aperture Q which extends through the wall of the flange F and provides a means whereby air may pass through said flange.

T represents a demountable flanged metallic tire constituted of material appropriate to its use and, in the case of a car wheel, constituted of a metal suited to withstand heavy abrasive wear. This tire T is circular in shape and is provided with an integral inwardly extending web W. On one side of this web, where the same faces the hub flange F, recesses R' are provided, said recesses corresponding in shape to the recesses R. At the center of the recesses R' the web is perforated at Q' in alignment with perforations Q of the flange F. Similar recesses R² are situated at the opposite sides of the tire web W. A clamping ring C, provided with recesses R³ and apertures Q², said recesses and apertures being in alignment, in the assembled wheel, with recesses R, R', R², and apertures Q, Q', respectively is detachably bolted to the hub element H—F. The clamping ring C at its inner peripheral portion, comprises an off-set portion O and a flange S. The flange S is adapted to fit within a corresponding annular seat S' cut in the hub member H. A plurality of bolts B positioned at regular spaced intervals as seen in Fig. 1, hold the clamping ring C in the seat S' in tight relation with respect to the hub member H—F. Resilient elements D, preferably flat and annular and centrally apertured in alignment with the apertures Q, Q', and Q², are seated within the respective recesses R, R', R², and R³ of the flange F, the web W and the ring C. Bolts P, spacers M, and nuts N, positioned alternately between adjacent recesses R³ (Fig. 1) supplement the maintenance of the fixed relation as between the hub element and the clamping ring C as effected by bolts B. Reinforcing webs V are preferably employed between adjacent bolts B to strengthen and to reinforce the joined portions of the clamping ring C. From the construction as thus far described, it will be apparent that the tire T is entirely free from direct contact or engagement with any metallic elements which constitute the hub or the metallic parts associated with the hub. The disks D which are preferably made of a material containing vulcanized rubber, receive, take up, and distribute the strains and stresses existing as between the hub member and its associated ring C on the one hand, and the tire web element W on the other. Heat engendered by such action in the disks D is reduced by the circulation of air which becomes possible by the alignment of the apertures Q, Q', and Q² with the central apertures of the rubber disks.

When the wheel is to be used on cars which require an electrical connection between the car and the railroad track as in the case of trolley cars or the like, I provide a plurality of suitable electrical connections, such as spring contacts K between the metallic portion of the hub structure (the off-set O of clamping ring C) and the web W or other portion of the metallic tire element T. Two of such electric contacts K are illustrated in the drawing, but more may be used if desired. These contacts K are shown as having a cantilever spring construction and as being attached at one end L by any suitable means to the off-set portion O of ring C and as having an upper end U free to maintain a continuous contact against the inner face of the web W of the tire T. In the operation of cars provided with my resilient wheels, it will be apparent that the resilient rings will be under compression. Due to the weight of the car the line of compression will, however, vary constantly in each of the resilient rings depending upon the position of the ring in the wheel, i. e., depending upon whether the ring is in the lowermost position nearest the track or the uppermost position, or some intermediate position. By providing an aperture at the center of the resilient disk and giving these disks a ring shape, the resilient material constituting the disks has an opportunity to move at this part of the ring. This movement being constant and continuous so long as the wheel is in motion, tends to preserve the resiliency of the rings which, as will be readily understood, are never placed in any position under compression in a completely confined space. There is always some open space into which the resilient material of the ring, as the ring is affected by compressive strain, can expand into. This element is of importance in prolonging the life and utility of the elastic disks and counteracting the effects of deterioration or destruction which compressive strains would otherwise rapidly evoke.

In assembling the wheel, disks D are first inserted in the recesses R and if the wheel is assembled in a vertical position, a temporary adhesive may be employed to retain the disks D in said recesses during the process of assembling the wheel. The tire T, with its web W, is then placed against the disks seated in the recesses R in such a manner that the recesses R' of the web W receive the projecting faces of the disks previously inserted in recesses R. A second set of disks D is then placed in the recesses on the other face of the web W. The bolts P and spaces M are set in place. The clamping ring C is then set into position with its recesses R³ encompassing the projecting faces of those disks D which were previously seated in recesses R². The bolts B are then inserted and tightened and the nuts N screwed upon the threaded ends of the bolts P, and the wheel is then complete.

When the tread portion of a wheel of the new construction requires replacement, the procedure is reversed. The bolts B and nuts N are first removed, the clamping ring C detached, and the worn tire ring T taken off. A new tire ring T is then set in place and the clamping ring C is again tightened up after the disks have been appropriately placed in their respective recesses. The apertures Q, Q', and Q², can be used in the assembly or repair of the wheels as a means by which proper alignment of the various wheel elements is facilitated. It will be observed that the relative arrangement of parts is such that the tires of car wheels may be changed easily and quickly without the necessity of removing the entire wheel from the axle or removing the whole axle, with a pair of wheels attached, from the truck. The ready substitution of the tire element T which my structure affords, makes it possible to build cars or trucks such as may be used for the transportation of freight, for the dual purpose of permitting them to run as railway cars or motor trucks or trailers on ordinary roads. This result can be accomplished by merely removing the steel tire shown in this application and replacing it by an automobile truck tire of the character shown in my application, Serial No. 166,636, filed February 8, 1927. By interchanging such tires in the manner described, it will be possible for automobile trucks operating on railways with steel rail wheels, to be quickly equipped with tires having a rubber tread, so that the vehicle is enabled to proceed from the rails directly to the place where the cargo is to be delivered without unloading and reloading. It will thus be obvious that this new procedure is capable of effecting a material economy in the transportation of goods and of increasing the operating ranges and possibilities of motor trucks. It will further be noted that my invention makes it possible to construct a car wheel in which each member may be made of material especially adapted to fulfill its particular function and to withstand the specific operating conditions and stresses to which it is subjected. When the improved resilient wheels used on trolley cars or other passenger conveying cars, a large part of the noise and vibration are eliminated.

I claim:

1. A resilient car wheel comprising a metallic hub having a seat cut therein and a radially extending flange projecting therefrom, said flange having a plurality of recesses disposed at spaced intervals adjacent to the periphery thereof, a detachable clamping ring fitting in the seat of the hub, and means for effecting a tight connection between said clamping ring and said hub, a plurality of recesses in the clamping ring, a demountable metallic tire provided with a web having recesses on opposite faces corresponding to those of the clamping ring and of the flange, and a plurality of resilient disk-like elements positioned in the aforesaid recesses between the flange and the web of the tire and between said web and the clamping ring.

2. A resilient car wheel such as set forth in claim 1 in which apertures adapted for the passage of air therethrough are arranged in registry in the flange, in the tire web, in the resilient disks, and in the clamping ring.

3. A resilient car wheel such as set forth in claim 1, in which the hub member is constructed of material especially adapted to resist wear and stresses developed at the hub portion of the wheel, while the tire element is constructed of material especially adapted to resist wear developed at the tread of said tire element.

4. A resilient car wheel such as set forth in claim 1, in which the tire element is flanged at one edge only of the tread portion, said flange being located at that part of the wheel closest to the flange of the hub.

5. A resilient car wheel as set forth in claim 1 in which at points intermediate between the recesses for the resilient disks, spacers and holding means are provided as between the hub flange and the clamping ring.

6. A resilient car wheel comprising a metallic hub, a radially extending flange associated therewith, a plurality of recesses in said flange, a demountable metallic tire having a web and recesses in said web on opposite sides thereof, a clamping ring having recesses, elastic elements of electrically nonconductive material seated in the various recited recesses, means for uniting the clamping ring with the hub in such a manner that the tire element and its web will be electrically disconnected by the elastic elements and by free spaces from all parts of the hub and of the clamping ring, and resilient electric connections between an electrically conductive element associated with the hub on the one hand and the webbed tire on the other hand.

7. A resilient car wheel such as described in claim 6, in which the resilient electric connections are fixedly attached at one end and maintain a resilient touching contact at the other end.

8. A resilient car wheel comprising a metallic hub having a seat cut therein and a radially extending flange projecting therefrom, said flange having a plurality of recesses disposed at spaced intervals adjacent to the periphery thereof, a detachable clamping ring fitting in the seat of the hub, and means for effecting a tight connection between said clamping ring and said hub, a plurality of recesses in the clamping ring, a demountable metallic tire having a rail-engaging outer surface substantially parallel to the axis of the hub and a circular flange extending approximately perpendicular to said surface, said tire being provided at its inner surface with a web having recesses on opposite faces corresponding to those of the clamping ring and of the flange, and a plurality of resilient disk-like elements positioned in the aforesaid recesses between the flange and the web of the tire and between said web and the clamping ring.

9. A resilient car wheel comprising a metallic hub having a radially extending flange associated therewith, a plurality of recesses in said flange, a demountable metallic tire having a web and recesses in said web on opposite sides thereof, a clamping ring having recesses, elastic elements seated in the various recesses of the clamping ring, the flange, and the web, means for uniting the clamping ring with the hub whereby the web will have limited movement between the clamping ring and the hub flange, and electrical connections between the hub and the metallic tire.

In testimony whereof I have hereunto set my hand.

ROBERT H. PROSSER.